United States Patent [19]
Brayden, Jr. et al.

[11] Patent Number: 6,052,191
[45] Date of Patent: Apr. 18, 2000

[54] COATING THICKNESS MEASUREMENT SYSTEM AND METHOD OF MEASURING A COATING THICKNESS

[75] Inventors: Thomas H. Brayden, Jr., Irving; Thomas D. Winters, Jr., Arlington, both of Tex.

[73] Assignee: Northrop Grumman Corporation, Los Angeles, Calif.

[21] Appl. No.: 09/170,825

[22] Filed: Oct. 13, 1998

[51] Int. Cl.[7] ................................................. G01B 11/06
[52] U.S. Cl. ......................... 356/381; 356/372; 356/382
[58] Field of Search ................... 356/369, 364, 356/357, 381, 2, 375, 382

[56] References Cited

U.S. PATENT DOCUMENTS

| | | | |
|---|---|---|---|
| 4,201,475 | 5/1980 | Bodlaj | 356/381 |
| 4,865,445 | 9/1989 | Kuriyama et al. | 356/73 |
| 4,952,226 | 8/1990 | Frazee, Jr. et al. | 65/3.12 |
| 5,120,966 | 6/1992 | Kondo | 250/372 |
| 5,181,080 | 1/1993 | Fanton et al. | 356/381 |
| 5,232,547 | 8/1993 | Drowley et al. | 156/601 |
| 5,237,392 | 8/1993 | Hickel et al. | 356/381 |
| 5,355,083 | 10/1994 | George et al. | 324/229 |
| 5,381,233 | 1/1995 | Chao et al. | 356/369 |
| 5,442,573 | 8/1995 | Bredberg et al. | 356/381 |
| 5,631,171 | 5/1997 | Sandstrom et al. | 356/369 |
| 5,640,242 | 6/1997 | O'Boyle et al. | 356/381 |
| 5,686,993 | 11/1997 | Kokubo et al. | 356/381 |
| 5,726,455 | 3/1998 | Vurens | 356/369 |

*Primary Examiner*—Robert H. Kim
*Assistant Examiner*—Roy M. Punnoose
*Attorney, Agent, or Firm*—Terry J. Anderson; Karl J. Hoch, Jr.

[57] ABSTRACT

A coating thickness measurement system (10) for measuring a thickness of a coating (12) on a coated substrate (14) is provided. The coating thickness measurement system (10) may comprise a light source (16), a detector system (18), and a processor (20). The light source (16) directs a light beam (22) at an angle (26) oblique to an axis (28) of the coating (12). The light beam (22) striking the coating (12) produces a reflected light beam (36). The detector system (18) measures a reflectivity of the coating (12). The processor (20) receives the reflectivity measurement and determines the reflectivity of the coating (12). The thickness of the coating (12) is determined from the reflectivity of the coating (12).

20 Claims, 2 Drawing Sheets

AVERAGE INTENSITY VERSUS ANODIZE COATING THICKNESS ON ALUMINUM

COATING THICKNESS MEASUREMENT SYSTEM AND METHOD OF MEASURING A COATING THICKNESS

TECHNICAL FIELD OF THE INVENTION

This invention relates generally to the field of measurement devices, and more particularly to a coating thickness measurement system and method of measuring a coating thickness.

BACKGROUND OF THE INVENTION

In many industries and applications, a coating, or film, is formed on a substrate. The coating may be part of a layered fabrication process, such as in semiconductor fabrication applications, or a barrier to protect the substrate, such as paint and anodizing. In many applications, the thickness of the coating must be measured.

Conventional measurement systems for measuring the thickness of a coating are generally destructive or nondestructive. Conventional destructive measurement systems often examine a random sample during production of the coated parts. The sample is cut or otherwise destroyed in order to produce a cross-sectional view of the coating that can then be physically measured. Conventional destructive measurement systems have the disadvantage of destroying a representative sample of the coated parts, thereby increasing the production cost of the coated parts. In addition, destructive measurement systems assume that the thickness of the coating on the sample is the same as the coating thickness on the other coated parts. Accordingly, the coating thickness on each coated part is not measured and verified.

Conventional nondestructive measurement systems are often used to measure very thin layers during semiconductor fabrication processes. In particular, semiconductor fabrication processes generally measure thicknesses on the order of 1,000 Angstroms or less. Some conventional nondestructive measurement systems utilize a spectral imaging system to measure the reflectivity properties of light that is reflected off the thin film. Optics are generally used to focus the light at a normal angle onto the thin film. The reflected light may then be collected by the same optics and directed to a spectrometer to measure the spectral properties of the reflected light. The spectral properties of the reflected light are indicative of the thickness of the thin film.

Conventional nondestructive measurement systems do not accurately measure the thickness of films and coatings having a thickness on the order of one micron and greater. In addition, conventional nondestructive measurement systems are not particularly suited for measuring film and coating thicknesses on parts larger than semiconductor wafers. Furthermore, many conventional nondestructive measurement systems are particularly adapted to measure only transparent and semitransparent films. In particular, conventional nondestructive measurement systems, such as eddy current testing, cannot accurately measure the thickness of anodized coatings.

SUMMARY OF THE INVENTION

Accordingly, a need has arisen for an improved device for measuring coating thicknesses. The present invention provides a coating thickness measurement system and method of measuring a coating thickness that substantially reduces or eliminates problems associated with prior systems and methods.

In accordance with one embodiment of the present invention, a coating thickness measurement system comprising a light source, a detector system, and a processor is provided. The light source operates to direct a light beam obliquely at a coating on a coated substrate. The light beam striking the coating produces a reflected light beam. The detector system operates to measure a reflectivity of the coating from the reflected light beam. The processor determines a thickness of the coating from the reflectivity of the coating. In a particular embodiment, the coating comprises a chromic acid anodized coating and the substrate comprises aluminum.

Technical advantages of the present invention include providing a simple and easy-to-use measurement device that nondestructively measures the thickness of a coating on a substrate. Accordingly, the coating thickness on a production part can be directly verified.

Another technical advantage of the present invention is that the coating thickness measurement system operates to measure the coating thickness without directly contacting the coating or requiring the use of emulsifiers and the like. Accordingly, the coating is not damaged by the coating thickness measurement system while measuring the coating thickness.

Yet another technical advantage of the present invention is that the coating thickness measurement system can accurately measure chromic anodized coatings on an aluminum substrate. In particular, the coating thickness measurement system can accurately measure anodized coatings having a thickness greater than one micron. In addition, the coating thickness measurement system can measure anodized coating thicknesses with greater accuracy than many conventional measurement methods, such as eddy current inspection processes.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like referenced numerals represent like parts, in which.

DETAILED DESCRIPTION OF THE INVENTION

Figure 1:
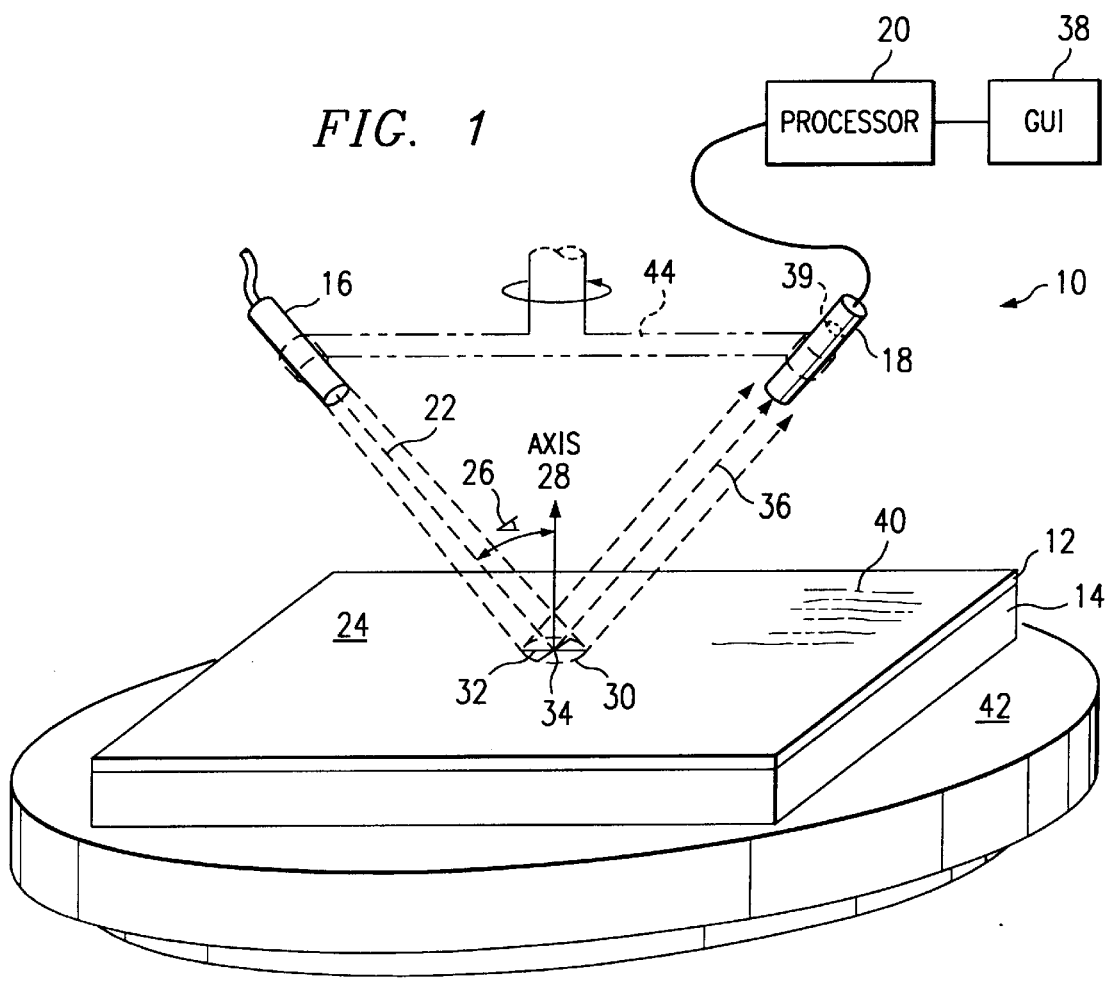
FIG. 1 is a schematic diagram illustrating a coating thickness measurement system in accordance with the present invention.
Figure 2:
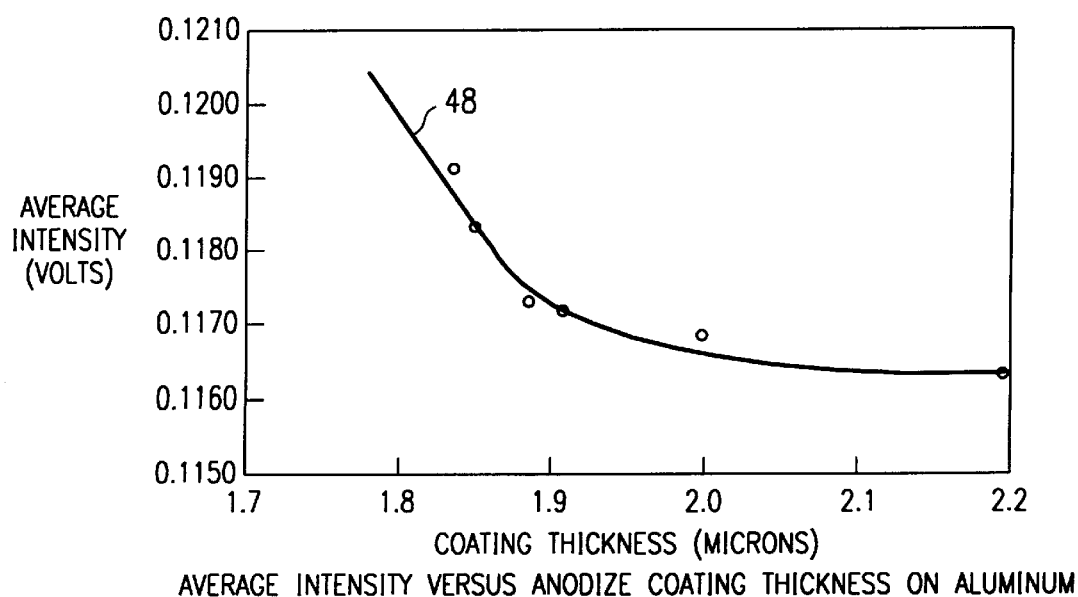
FIG. 2 is a reflectivity/thickness graph for a chromic acid anodized coating on an aluminum substrate in accordance with the present invention.
Figure 3:
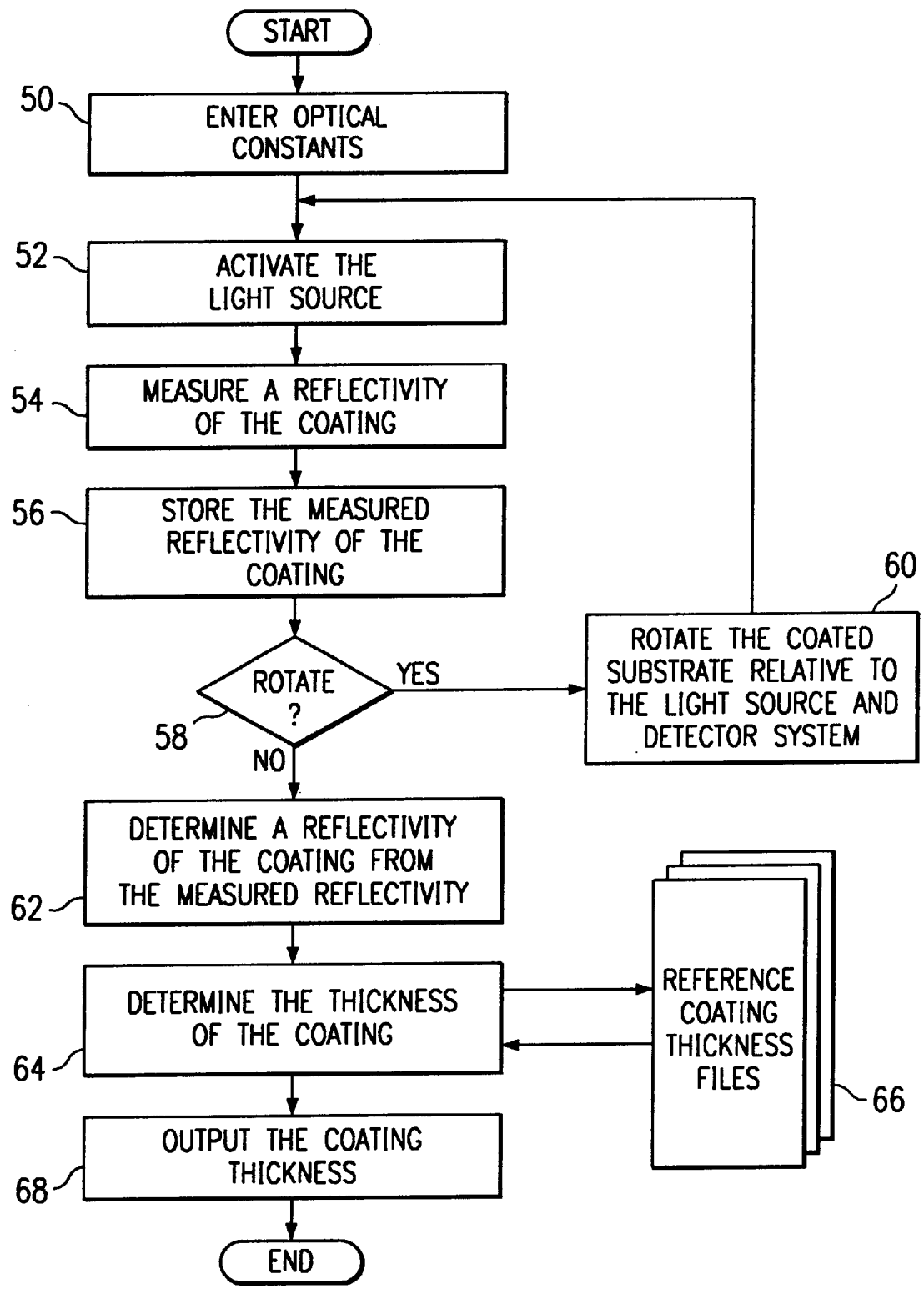
FIG. 3 is a flow diagram illustrating a method of measuring a coating thickness in accordance with the present invention.

FIGS. 1 through 3 illustrate a coating thickness measurement system. As described in greater detail below, the coating thickness measurement system directs a light beam at a coating on a coated substrate. The reflectivity of the reflected light beam from the coating is indicative of the thickness of the coating.

FIG. 1 is a schematic diagram illustrating a coating thickness measurement system 10 for measuring the thickness of a coating 12 on a coated substrate 14. The coating thickness measurement system 10, as illustrated, is particularly suited for measuring the thickness of chromic acid anodize coatings on an aluminum substrate. However, it will be understood that the coating thickness measurement system 10 may be otherwise used to measure the thickness of any suitable coating 12 on any suitable coated substrate 14.

As will be described in greater detail below, the coating thickness measurement system 10 comprises a light source 16, a detector system 18, and a processor 20. The light source 16 operates to produce a light beam 22 that is directed at the coating 12. The light beam 22 strikes a surface 24 of the coating 12 at an angle 26 that is oblique from an axis 28 perpendicular to the surface 24. The light beam 22 striking the coating 12 forms a light spot 30 on the surface 24 of the coating 12. The light spot 30 has an associated major axis 32 and minor axis 34 as a result of the angle 26.

A reflected light beam 36 is produced by the reflection of the light beam 22 striking the surface 24 of the coating 12. The detector system 18 measures the properties of the reflected light beam 36 and determines a measured reflectivity of the coating 12. The reflectivity measurement is communicated and stored in the processor 20. The reflectivity measurements are used to determine the reflectivity of the coating 12. Based on the reflectivity of the coating 12, the processor 20 determines the thickness of the coating 12 on the coated substrate 14. In a particular embodiment, the coating thickness measurement system 10 also comprises a graphical user interface 38. As will be described in greater detail below, the graphical user interface 38 allows a user (not expressly shown) to interact with the processor 20.

A change in the angle 26 generally changes the reflectivity measurement of the coating 12, as well as the length of the major axis 32. In many applications, the angle 26 is experimentally determined to optimize the sensitivity of the reflectivity measurements. For example, in an embodiment for measuring the thickness of a chromic acid anodize coating on an aluminum substrate, the angle 26 is on the order of 38 degrees and the light source 16 and the detector system 18 are each spaced approximately 2.3 inches from the light spot 30 on the coating 12. It will be understood that the angle 26 may be suitably varied without departing from the scope of the present invention.

The light source 16 is generally a laser system that produces a focused coherent light beam 22 having a specific wavelength and intensity. The wavelength and intensity of the light beam 22 are chosen to optimize the sensitivity of the reflectivity measurements with regard to the particular type of coating 12 and coated substrate 14. For example, in an embodiment in which the coating 12 is a chromic acid anodized coating and the coated substrate 14 is aluminum, the light source 16 comprises a diode laser, and the light beam 22 has a wavelength of approximately 670 nanometers, with an intensity on the order of 4.3 milliwatts. In a particular embodiment, the light beam 22 is polarized in the direction of the minor axis 34. The light source 16 may also comprise other suitable devices for producing a suitable light beam 22. For example, the light source 16 may include optics, optic filters, and the like. In addition, it will be understood that the wavelength and intensity of the light beam 22 may be suitably varied without departing from the scope of the present invention.

The detector system 18 measures the properties of the reflected light beam 36 and outputs the measured reflectivity of the coating 12 to the processor 20. In one embodiment, the property of the reflected light beam 36 that is measured comprises an intensity of the reflected light beam 36 incident upon the detector system 18. In this embodiment, the detector system 18 comprises a photodetector 39 that produces an electrical signal that corresponds to the intensity of the reflected light beam 36 incident on the photodetector 39. The sensitivity of the reflectivity measurement can often be maximized by tuning the photodetector 39 to the particular wavelength of the light beam 22. In addition, the photodetector 39 is generally directionally shielded such that substantially all of the light impinging the photodetector is from the reflected light beam 36. In a particular embodiment, the photodetector 39 comprises a phototransistor (not expressly shown) and a phototransistor circuit (not expressly shown) that produces the electrical signal that corresponds to the intensity of the reflected light beam 36 incident upon the phototransistor. The detector system 18 may include other suitable devices without departing from the scope of the present invention. For example, the detector system 18 may include digital processor capabilities for conditioning the electronic signal from the photodetector, such as filters, amplifiers, and the like. The photodetector 39 provides a simple and inexpensive device for measuring the reflectance of the coating 12.

As will be discussed in greater detail below, the reflectivity of the coating 12 may comprise one or more reflectivity measurements. In particular, in some applications a grain direction 40 is associated with the material comprising the coated substrate 14. The grain direction 40 can change the measured reflectivity of the coating 12 depending upon the direction the measurement is taken relative to the grain direction 40. In one embodiment, the measured reflectivity is taken in a predetermined direction with respect to the grain direction 40. In another embodiment, multiple reflectivity measurements are taken from different directions relative to the grain direction 40. In this embodiment, the coated substrate 14, with respect to the light source 16 and the detector system 18, is rotated and reflectivity measurements are taken at specific increments of the rotation.

In a specific embodiment, a reflectivity measurement is taken at 90 degree increments starting from a direction parallel to the grain direction 40. In other words, a 0 and 180 degree reflectivity measurement is obtained when the major axis 32 is parallel to the grain direction 40, and a 90 and 270 degree reflectivity measurement is obtained when the minor axis 34 is parallel to the grain direction 40. It will be understood that the reflectivity may be measured in any suitable increment and direction without departing from the scope of the present invention.

As discussed previously, the reflectivity of the coating 12 may comprise one or more reflectivity measurements. In one embodiment, the coated substrate 14 is coupled to a base 42. The base 42 operates to rotate the coated substrate 14 about the axis 28. In this embodiment, the base 42 can rotate relative to the light source 16 and detector system 18, which allows reflectivity measurements to be taken from different directions relative to the grain direction 40. In another embodiment, the light source 16 and detector system 18 are coupled to a fixture 44. The fixture 44 allows the light source 16 and the detector system 18 to rotate independently of the coated substrate 14, which allows reflectivity measurements to be taken from different directions relative to the grain direction 40.

The processor 20 operates to store the reflectivity measurements from the detector system 18 and determine the thickness of the coating 12. The reflectivity of the coating 12 is determined from the reflectivity measurements stored in the processor 20. In one embodiment, the reflectivity of the coating 12 comprises a single reflectivity measurement. In another embodiment, the reflectivity of the coating 12 comprises a calculated reflectivity. For example, in one embodiment, the calculated reflectivity comprises an average of several reflectivity measurements, such as an average of the reflectivity measurements taken in 90 degree increments relative to the grain direction 40. In yet another embodiment, the reflectance of the coating 12 comprises a number of reflectivity measurements that will be used independently to determine and check the thickness of the coating 12. In this embodiment, the thickness of the coating 12 can be independently determined by different reflectivity values in order to double-check the thickness of the coating 12.

The reflectivity of the coating 12 is used in conjunction with a number of reference coating thickness files to determine the thickness of the coating 12 on the coated substrate 14. Each respective reference coating thickness file may contain information regarding the type of coating and coated substrate. Each reference coating thickness file also comprises reference coating thickness values as a function of a reference reflectivity. As will be described in greater detail below, the reference reflectivity and coating thickness values are generally experimentally determined through destructive analysis of multiple samples.

In one embodiment, each reference coating thickness file comprises a set of reference reflectivity data measurements and their corresponding reference coating thickness values. In this embodiment, the thickness of the coating 12 is determined by comparing the reflectivity of the coating 12 to the respective reference coating thickness file. The thickness of the coating 12 is the reference coating thickness value corresponding to the reflectivity. In other words, the reflectivity is matched to a specific reference reflectivity data measurement. The reference coating thickness value corresponding to that specific reference reflectivity data measurement is the thickness of the coating 12.

In another embodiment, each reference coating thickness file comprises a mathematical equation that describes the reference reflectivity data measurements relative to the reference coating thickness values. In this embodiment, the reflectance of the coating 12 can be entered into the equation, and the thickness of the coating 12 is calculated.

FIG. 2 illustrates a reflectivity/thickness graph 48 of the reference reflectivity versus the reference coating thickness for a chromic acid anodized coating on an aluminum substrate. In general, the reference coating thickness files comprise the data illustrated in the reflectivity/thickness graph 48. The reflectivity/thickness graph 48 is generally determined by experimentally measuring the reflectivity of several coated substrate samples and then measuring the actual coating thickness of each sample. The actual coating thickness of each sample is generally determined by a standardized destructive process, such as the ball-cratering process.

In other words, reflectivity measurements are taken of several coated substrate samples having various coating thicknesses. Each coated substrate sample is then destructively tested to measure the actual thickness of the coating on the coated substrate sample. The reflectivity/thickness graph 48 of the reflectivity versus the coating thickness is then calculated for that particular coating 12 and coated substrate 14. Each reference coating thickness file is based on the reflectivity/thickness graph 48 for a particular type of coated substrate 14.

FIG. 2 illustrates a specific embodiment of the reflectivity/thickness graph 48 for a chromic acid anodized coating on an aluminum substrate. In this embodiment, the reflectivity/thickness graph 48 is an experimentally determined plot of the average intensity of the reflected light beam 36 versus the actual thickness of the coating 12. The average intensity of the reflected light beam 36, for this embodiment, was determined by averaging the measured reflectivity at 0, 90, 180, and 270 degrees relative to the grain direction 40.

FIG. 2 also illustrates several specific experimental measurements, as shown by the circular dots, of the average intensity of the reflected light beam 36 and the actual thickness of the coating 12 for various thickness of the coating 12. The reflectivity/thickness graph 48 will generally vary for each different type of coating 12, coated substrate 14, angle 26, light source 16, and detector system 18. Each reference coating thickness file will generally contain the respective information from a particular reflectivity/thickness graph 48. The reflectivity/thickness graph 48 may also be characterized by a mathematical equation such that the thickness of the coating 12 is determined by inputting the reflectivity data and solving for the thickness of the coating 12.

FIG. 3 is a flow diagram illustrating a method of measuring a coating thickness. The optical constants are entered, as shown by step 50. The optical constants may include the type of coating 12 and coated substrate 14 to be tested, the intensity of the light beam 22 produced by the light source 16, the configuration of the coating thickness measurement system 10, and the like. The optical constants are generally entered into the processor 20 by the user through the graphical user interface 38.

The light source 16 is then activated, as shown by step 52. The light source 16 produces the light beam 22, and directs the light beam 22 at the surface 24 of the coating 12. The light beam 22 is reflected from the surface 24 of the coating 12 to form the reflected light beam 36.

The reflectivity of the coating 12 is then measured and stored, as shown by steps 54 and 56, respectively. As discussed previously, the reflectivity measurement may comprise the intensity of the reflected light beam 36 incident on the detector system 18, however, the reflectivity measurement may comprise other suitable reflectivity properties without departing from the scope of the present invention.

The reflectivity of the coating 12 may comprise one or more reflectivity measurements taken from different directions. If additional reflectivity measurements are required, the coated substrate 14 is rotated relative to the light source 16 and the detector system 18, as shown by steps 58 and 60. After rotating, the reflectivity measurements are taken and stored as previously described in steps 52 through 56. If all reflectivity measurements have been completed, the reflectivity of the coating 12 is then determined, as shown by steps 58 and 62. As discussed previously, the reflectivity of the coating 12 may be determined by a number of different methods.

The reflectivity of the coating 12 is used in conjunction with a number of reference coating thickness files to determine the thickness of the coating 12, as shown by steps 64 and 66. As described previously, the reference coating thickness files contain experimentally derived reference values for the reflectance and the thickness of the coating 12. Based on the reflectance, the thickness of the coating 12 is determined from the appropriate reference coating thickness file. The thickness of the coating 12 is then output, as shown by step 68. In many applications, the thickness of the coating 12 is output to the graphical user interface 38. In other applications, the thickness of the coating 12 may be output to a computer system that determines whether the coated substrate 14 is acceptable.

Although the present invention has been described in several embodiments, various changes and modifications may be suggested to one skilled in the art. It is intended that the present invention encompass such changes and modifications that fall within the scope of the appended claims.

What is claimed is:

1. A coating thickness measurement system comprising:
    a light source operable to direct a light beam obliquely at a coating the coating having a surface, on a coated substrate and produce a reflected light beam reflected from the surface of the coating;
    a detector system operable to measure a reflectivity of the coating surface from the reflected light beam; and
    a processor operable to determine a thickness of the coating based on the reflectivity of the coating surface.

2. The coating,thickness measurement system of claim 1, wherein the light source comprises a laser.

3. The coating thickness measurement system of claim 1, wherein the light source comprises a laser that produces the light beam at a wavelength on the order of 600–700 nanometers and an intensity on the order of 4–5 milliwatts.

4. The coating thickness measurement system of claim 1, wherein the reflectance comprises an intensity of the reflected light beam.

5. The coating thickness measurement system of claim 1, wherein the coating comprises a chromic acid anodize coating.

6. The coating thickness measurement system of claim 1, further comprising a rotating base operable to rotate the coated substrate about an axis substantially perpendicular to the surface of the coating.

7. The coating thickness measurement system of claim 1, wherein the reflectivity comprises a calculated reflectivity.

8. The coating thickness measurement system of claim 1, wherein the light beam forms a light spot with a minor axis on the surface of the coating, and the light beam is polarized in the direction of the minor axis.

9. The coating thickness measurement system of claim 1, wherein the processor further comprises a reference coating thickness file that comprises a mathematical model for computing the thickness of the coating from the reflectance of the coating surface.

10. A coating thickness measurement system comprising:
    a light source operable to direct a polarized light beam at an anodize coatings, the anodize coating having a surface, on a coated substrate and produce a reflected light beam reflected from the surface of the anodize coating, the light beam incident on the anodize coating surface at an angle oblique to an axis substantially perpendicular to the surface of the anodize coating;
    a rotating base operable to rotate the coated substrate through a plurality of rotational angles about the axis substantially perpendicular to the surface of the anodize coating;
    a detector system operable to measure a reflectance of the anodize coating surface at each rotational angle; and
    a processor operable to determine a reflectance of the anodize coating surface from the reflectance measurements, and then determine a thickness of the anodize coating based on the reflectance of the anodize coating surface and a reference coating thickness file.

11. The coating thickness measurement system of claim 10, wherein each reflectance measurement comprises an intensity of the reflected light beam.

12. The coating thickness measurement system of claim 10, wherein the reference coating thickness file comprises a mathematical model for computing the thickness of the coating from the reflectance of the coating surface.

13. The coating thickness measurement system of claim 10, the reference coating thickness file comprises a set of reference reflectivity data measurements and their corresponding reference coating thickness values.

14. The coating thickness measurement system of claim 10, wherein the light source comprises a laser that produces the light beam at a wavelength on the order of 600–700 nanometers and an intensity on the order of 4–5 milliwatts.

15. A method of measuring a thickness of a coating, comprising:
    providing a coated substrate having the coating disposed outwardly from the coated substrate, the coating having a surface;
    directing a light beam at the coating at an angle oblique to an axis substantially perpendicular to the surface of the coating, the light beam incident upon the coating surface producing a reflected light beam reflected from the surface of the coating;
    measuring and storing a reflectivity of the reflected light beam;
    determining a reflectivity of the coating surface from the reflectivity measurements; and
    determining the thickness of the coating from the reflectivity of the coating surface.

16. The method of claim 15, wherein determining the thickness of the coating comprises determining the thickness of the coating from a mathematical model that computes the thickness of the coating from the reflectance of the coating surface.

17. The method of claim 15, wherein the step of measuring and storing a reflectance comprises measuring and storing a reflectance measurement from various rotational angles of the coated substrate.

18. The method of claim 15, wherein determining a reflectivity of the coating surface from the reflectivity measurements comprises determining a reflectivity of the coating surface from an average of the reflectivity measurements.

19. The method of claim 15, wherein determining a reflectivity of the coating surface from the reflectivity measurements comprises determining a reflectivity of the coating surface from individual sets of reflectivity measurements.

20. The method of claim 15, wherein directing a light beam at the coating comprises directing a polarized light beam at an angle oblique to an axis substantially perpendicular to the surface of the coating, the light beam incident upon the coating surface producing a reflected light beam.

* * * * *